United States Patent [19]

Womack

[11] 4,110,620
[45] Aug. 29, 1978

[54] FUEL ROD LEAK DETECTOR

[75] Inventor: Robert Edward Womack, Lynchburg, Va.

[73] Assignee: The Babcock & Wilcox Co., New York, N.Y.

[21] Appl. No.: 556,762

[22] Filed: Mar. 10, 1975

[51] Int. Cl.² ............................................. G01T 1/20
[52] U.S. Cl. ................................ 250/361 R; 250/336
[58] Field of Search ...................... 176/19 LD, 80, 37; 250/308, 498, 496, 393, 336, 356, 491, 361, 370, 505

[56] References Cited

U.S. PATENT DOCUMENTS

| 3,178,355 | 4/1965 | Jacobs | 176/19 LD |
| 3,663,363 | 5/1972 | Crouthamel et al. | 176/19 LD |
| 3,823,068 | 7/1974 | Worlton et al. | 176/80 |
| 3,878,040 | 4/1975 | Martucci | 176/19 LD |

Primary Examiner—Harold A. Dixon
Attorney, Agent, or Firm—J. M. Maguire; J. P. Sinnott

[57] ABSTRACT

A typical embodiment of the invention detects leaking fuel rods by means of a radiation detector that measures the concentration of xenon-133 ($Xe^{133}$) within each individual rod. A collimated detector that provides signals related to the energy of incident radiation is aligned with one of the ends of a fuel rod. A statistically significant sample of the gamma radiation ($\gamma$-rays) that characterize $Xe^{133}$ is accumulated through the detector. The data so accumulated indicates the presence of a concentration of $Xe^{133}$ appropriate to a sound fuel rod, or a significantly different concentration that reflects a leaking fuel rod.

3 Claims, 2 Drawing Figures

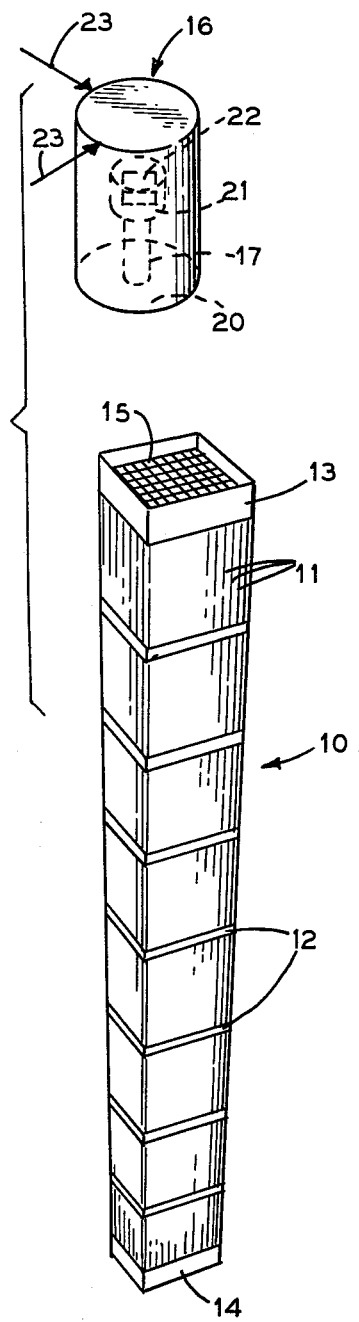

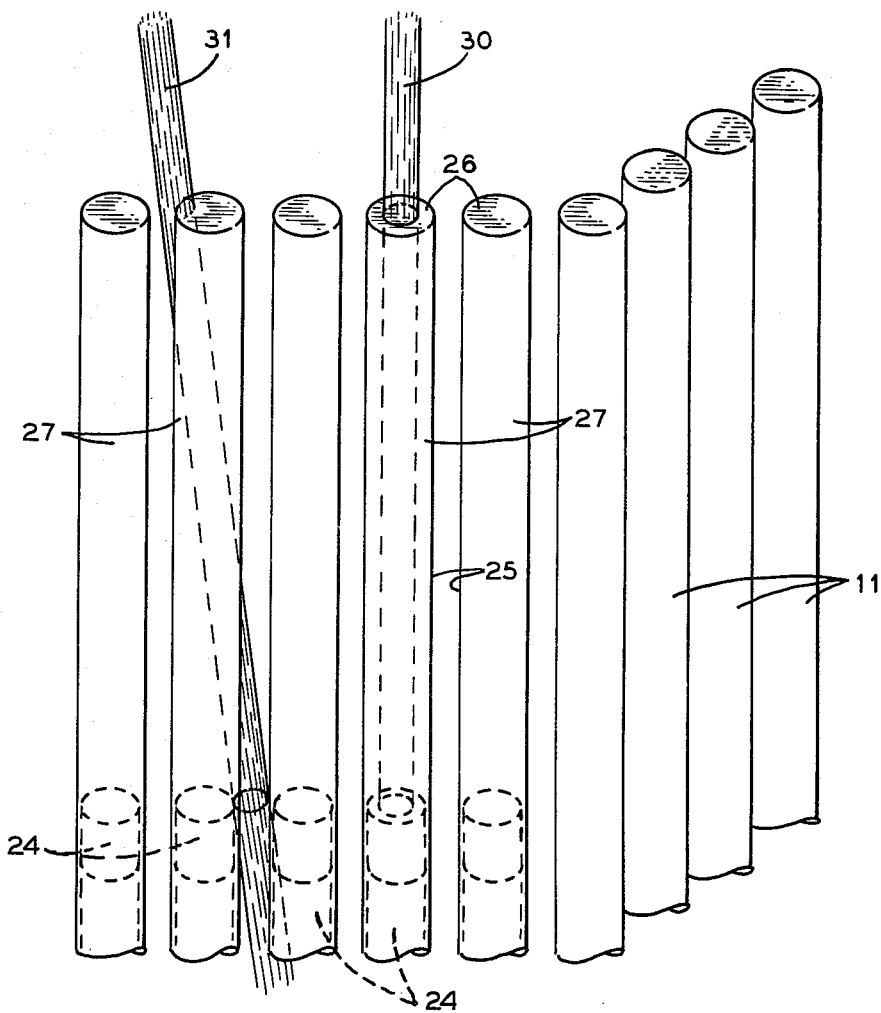

FUEL ROD LEAK DETECTOR

BACKGROUND OF THE INVENTION

1. Field of the Invention

This invention relates to inspection techniques, and more particularly, to a radiation detection method and apparatus for identifying leaking fuel rods within a nuclear reactor core, and the like.

2. Summary of the Prior Art

Nuclear reactors for power generation, for research and for other purposes need a "critical" concentration of fissionable material. This concentration—or reactor "core"—frequently comprises an array of long, slender, hollow metal rods, or "cladding," that each contain a respective stack of fuel pellets. The fuel pellets most commonly encountered are formed of uranium dioxide ($UO_2$).

During reactor operation, some of the fissionable uranium nuclei in these fuel pellets absorb neutrons that cause the respective uranium nuclei to split into two new nuclei, each with about half of the atomic mass of the parent uranium nucleus. These new nuclei, which are frequently radioactive, should remain within the enclosing metal rod. Escape of these radioactive materials from the fuel rod structure could lead to serious safety problems, or at least to the need to conduct a troublesome and costly radiation decontamination effort.

The environmental conditions in power reactor cores tend to aggravate this situation. Thus, high temperatures, pressures and intense radiation within the core can produce an occasional fuel rod failure in the form of a tiny rupture in the cladding.

In the case of a pressurized water reactor, for example, the "primary coolant," or water under pressure that removes heat from the reactor core, is monitored for radioactivity. An appreciable increase in the radioactivity of this water from some predetermined mined level is indicative of one or more "failed" fuel rods within the reactor core. This conclusion is based on the assumption that these additional radioactive contaminants probably have leaked out of a fuel rod and into the adjacent stream of flowing water.

On registering an undesirably high level of radioactive contamination in the primary coolant, the reactor must be shut down and the individual fuel rods inspected to identify and replace the one or more rods that have failed. The task of inspecting these rods, especially in a power reactor, is very difficult and quite expensive. For instance, the heavy reactor pressure vessel must be opened, each of the bundles of 200 or more fuel rods that comprise the individual fuel elements from which the reactor core is assembled must be removed from the core and individually inspected for the presence of a failed fuel rod. In this respect it should be noted that commercial power reactors each may have as many as 36,000 or more fuel rods in the core.

The actual inspection technique that is usually employed is known as "sipping." In this technique, the fuel element is placed in a "sipping can" and water or air is pumped through the fuel element assembly. The fluid flowing from the assembly is monitored for the presence of radiation. The observation of an inordinate amount of radiation in the effluent indicates the possibilities of either a failed fuel rod within the fuel element undergoing inspection or that the fluid is scouring from the rods radioactive contamination that adhered to the rod surfaces. In addition to this ambiguous indication, there is the further possibility that a rod which does leak under normal reactor operating conditions might not leak in the conditions that exist within the sipping can.

Another technique requires the removal of an individual fuel rod from a fuel element assembly. This is, of course, a difficult and time-consuming task, especially if the fuel in question has been partially used, or "burned," and produces so high a level of radiation that fuel rod removal must be accomplished behind radiation shielding with remote control manipulators.

The rod in question is sealed in a receptacle that has a chamber, or plenum, for accumulating any fission products that might leak from the rod. A radiation detector is spaced from a portion of the plenum by means of a radiation absorbing shield that has a passageway, or collimator, which aligns the radiation detector with the portion of the plenum under observation. In this way, the detector generates an electrical signal in response to any radioactive fission products that may have escaped from the fuel rod. Naturally, an abnormally high radiation level in the plenum portion is indicative of a possible rupture in the fuel rod. This particular technique also relies on the detection of fission products outside of the fuel rod cladding. Thus, if the fuel rod in question leaks during reactor operation, but does not leak in the inspection environment, a fuel rod that is in fact defective might actually remain undetected.

With respect to detection of these radioactive fission products, it should be noted that a number of radioactive elements emit $\gamma$-rays. In many instances, these $\gamma$-rays have energies which are unique to a particular isotope of the element in question, e.g. $Xe^{133}$, or the isotope of the element xenon that has an atomic mass of 133 units, emits a characteristic $\gamma$-ray of 0.085 million electron volts (MeV) energy. The "half-life" of this particular isotope, moreover, is approximately 5.3 days. Thus, during a period of 5.3 days half of the $Xe^{133}$ atoms present in a given quantity each will have emitted an 0.085 MeV $\gamma$-ray. In view of the essentially random nature of the $\gamma$-ray emissions from radioactive nuclei, in order to clearly identify the presence and concentration of a specific material, it is necessary for the detector to observe a sample for a sufficiently long period to accumulate a statistically significant number of detected $\gamma$-rays of an energy that characterizes the material in question. This statistical determination depends on a number of variables—detector sensitivity, background radiation level, and the like. It is, however, a problem that nuclear instrumentation specialists have successfully treated for many years.

Clearly, a radiation detector that is sensitive to the energy of the incident $\gamma$ radiation is needed for work of this nature. Generally, crystal scintillation detectors and semiconductor detectors provide this particular feature. More particularly, a semiconductor detector that typically comprises a "lithium drifted germanium" crystal, or cyrstal portion, responds to an incident $\gamma$-ray by generating an electrical signal that is related to the energy lost by the $\gamma$-ray within the crystal structure. The electrical signal generated in the foregoing manner is processed to identify those incident radiations. In this respect, a conventional electrical system that includes amplifiers and pulse height discriminator circuits isolates those signals that identify $\gamma$-rays in the energy range of interest. Each of these identified signals is termed a "count" and is added to a cumulative total of these counts to provide some indication of the presence of the associated isotope and, in appropriate circumstances, a further indication of the concentration of the isotope in the sample under consideration.

Thus, the prior art offered some means for detecting and identifying defective fuel rods. These prior art procedures were time-consuming, inefficient and frequently led to ambiguous or unreliable results. Consequently, there is a need for an improved technique for identifying failed fuel rods, especially within the reactor pressure vessel.

SUMMARY OF THE INVENTION

These and other problems that have characterized the prior art are, to a large extent, overcome through the practice of the invention. More particularly, a radiation energy-sensitive detector is enclosed in a shielded container, formed of iron or an equivalent material. The shield, moreover, is provided with a small collimating "tunnel" through which radiation emanating from one direction only may reach the detector. The collimator is aligned with the top of one of the fuel rods and kept in this alignment for a sufficient period of time to enable a statistically valid accumulation of counts to be registered to identify the presence of an appropriate concentration of radioactive fission products within the fuel rod cladding. If the proper concentration of fission products, or of a specific fission product, within the cladding are registered by the detector, it can be assumed that the structural integrity of the fuel rod has not been violated. Should the observed fission product inventory within the fuel rod be less than some standard that is commensurate with the use and exposure of the rod in question, it can be assumed that the rod under inspection has ruptured and has discharged some of the fission products.

In accordance with the present invention, the shielded and collimated detector observes fission product concentration within the fuel rod, and thereby establishes an indication of fuel rod integrity that is independent of the ability of the rod to discharge fission products into a test environment during inspection.

Further in this respect, the shielded and collimated detector can be mounted on an indexing device that selectively aligns the collimator and the detector with the ends of successive fuel rods that comprise the fuel elements in a reactor core, or in a fuel handling and storage canal. A typical indexing device is shown in F. S. Jabsen U.S. Pat. No. 3,894,327 filed on Oct. 23, 1973 and granted July 15, 1975 for "Industrial Technique", assigned to the same assignee as the instant invention. In this manner, the structural integrity of each fuel rod can be determined through direct observation without removing the individual rods from the reactor core or the fuel element array.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

FIG. 1 is a perspective view of a typical apparatus for practicing the invention; and FIG. 2 is a perspective view of a schematic diagram that illustrates typical detector-collimator-fuel rod alignments in accordance with the principles of the invention.

DETAILED DESCRIPTION OF THE PREFERRED EMBODIMENTS

For a more complete appreciation of the invention, attention is invited to FIG. 1. An illustrative fuel element 10, includes an array of parallel and spaced-apart fuel rods 11 that are held in proper relative positions by means of transversely disposed grids 12. Typically, the fuel rods 11 each have a thin outer metal cladding that encloses a vertical column of nuclear fuel pellets and a void space or plenum to accommodate fuel rod pressurization and fission gases.

The fuel element 10 is terminated with upper and lower end fittings 13 and 14, respectively. These fittings serve a number of purposes with respect to fuel rod stabilization, fuel element insertion, stability and withdrawal in the reactor core and the like. For the purpose of the invention, however, it is only necessary that the upper end fitting inner structure 15 is a generally open framework that exposes or does not obscure, extend over, or shield the transverse ends of the individual fuel rods.

For illustrative purposes, the fuel element 10 is shown in FIG. 1 in isolation. In the actual practice, however, the invention which will be described subsequently in more complete detail can be carried out with the fuel element 10 after use in a reactor core and in a highly radioactive condition. To protect personnel from the physically harmful effects of this radiation, the fuel element 10 must be appropriately shielded. In the case of a pressurized water reactor, for example, a 20 foot depth of water between the fuel element 10 and plant staff would provide a suitable radiation shield. Further in this regard, the individual rods 11 within the fuel element 10 also could be inspected in accordance with the principles of the invention while the fuel element is a part of the larger group of fuel elements that comprise the reactor core.

Spaced above the upper end fitting 13 and in general alignment with the fuel element 10 is a generally cylindrical radiation shield 16. The vertical axis of the cylindrical shield 16 (not shown in FIG. 1) is in alignment with a narrow collimator 17 that forms a passageway which extends from transverse end 20 of the shield 16 that is proximate to the upper end fitting 13 and an essentially central cavity 21 within the shield that houses a high resolution, energy sensitive radiation detector 22 of which the lithium-drifted germanium semiconductor detector is typical. Further in this respect, it is frequently necessary to cool detectors of this sort to extremely low temperatures. To provide this cooling, the detector often is mounted in a specially shaped Dewar flask that provides a reservoir of liquified nitrogen, or the like. Thus, not only is the detector 22 mounted in the shield 16, but the shield also accommodates cooling apparatus (not shown) as well as appropriate electrical circuit connections for the detector (also not shown).

The shield 16 and the radiation detector apparatus associated therewith is positioned in alignment with each of the individual fuel rods 11 in the fuel element 10 through an indexing apparatus 23 that is shown schematically in FIG. 1 as a pair of perpendicularly oriented arrows. Illustratively, the indexing apparatus can translate the shield 16 in two directions above the fuel rods 11 in the fuel element 10 in order to properly position the shield either through manual control in response to optical alignment, or automatically, in accordance with pre-established fuel rod locations within the fuel element relative to one or more established reference indicia.

Attention is further invited to FIG. 2 which show a portion of the top of some of the fuel rods 11 in the fuel element 10 that was illustrated in FIG. 1. The upper end fitting 13, also shown in FIG. 1, is not shown in FIG. 2 in order to clarify the methods of collimator alignment that are subsequently described in more complete detail. Accordingly, the fuel rods 11 each have stacks of fuel pellets 24 that are encased in thin tubes 25 of aluminum, stainless steel, zirconium or the like. Each of these tubes 25, moreover, are sealed with respective end caps 26. As shown in the drawing, the stacks of fuel pellets 24 are not coextensive with the inner volume of the sealed tubes 25, but terminate a predetermined distance below the end caps in order to provide a plenum 27 that accommodates fission product gases, and the like. Xenon, and particularly the radioactive $Xe^{133}$ isotope, is a typical fission product gas that tends to accumulate in the plenum 27.

If, in the practice of the invention, the 0.085 MeV $\gamma$-ray that characterizes this xenon isotope is selected for the purpose of fuel rod integrity inspection, the collimator 17 (FIG. 1) in the radiation shield 16 can be placed in vertical alignment with the longitudinal axis of one of the tubes 25, as shown in FIG. 2. In this configuration, only those $\gamma$-rays that are directed toward the detector in general alignment with and within a projection 30 of the collimator through the plenum 27 will be able to produce a detector response. The radiation energy discrimination circuits associated with the detector reject the incident radiation signals from the detecgtor that do not correspond to the 0.085 MeV $\gamma$-rays under observation. Those signals that are passed through the discrimination circuits are recorded in order to reflect the cumulative "counts" of the radiation energy in question. This cumulative "count," of course, is related to the $Xe^{133}$ concentration within the plenum 27.

Naturally, the time during which the $Xe^{133}$ "counts" are to be totaled is a function of the specific "counting statistics" that will characterize the inventory of fuel rods under inspection. As hereinbefore mentioned, these statistical determinations are based, in some measure, on detector sensitivity, background radiation and the like, as well as the anticipated concentration of $Xe^{133}$ within a particular fuel rod. As a consequence, if a predetermined number of accumulated $Xe^{133}$ counts are not acquired from an individual fuel rod within a given period of time, it can be reasonably concluded that the $Xe^{133}$ gas concentration within the plenum 27 is below the level that is to be expected of a sound fuel rod. In this circumstance, it is likely that the fuel rod under examination has a leak that enables the $Xe^{133}$ to flow from the fuel rod, rather than collect in the plenum 27.

On the other hand, if the counts accumulated match or exceed the imposed standard, it can be assumed that fission products have not leaked from the fuel rod, and that the rod is sound. Thus, the invention enables the integrity of the fuel rod to be determined through a direct measurement of the fission product inventory within the rod, in contrast with the ambiguities of prior techniques that relied in some way on an examination of fission products after escape from the rod interior.

It should be noted in FIG. 2 that the collimator projection 30 is in direct alignment with the longitudinal axis of the fuel pellet stack 24. Particular circumstances, e.g. the duration of fuel rod exposure within the nuclear reactor core, may produce an excessively high intensity of background radiation from the fuel pellet stack 24. If the collimator is in alignment with the longitudinal axes of the fuel pellet stack 24 and the associated tube 25, as shown in connection with the collimator projection 30, the high intensity background radiation from the fuel pellets may tend to obscure the less intense $Xe^{133}$ radiation under observation. In this circumstance, it is advisable to offset the collimator 17 (FIG. 1) in the radiation shield 16 (also FIG. 1) in order to produce a collimator projection 31 (FIG. 2) that forms an acute angle with the longitudinal axis of the fuel rod undergoing inspection. Proper selection of the offset angle should enable the collimator projection 31 to traverse the plenum 27 in its entirety and nevertheless to avoid coincidence with any substantial portion of the fuel pellet stack 24. As shown in the drawing, a further continuation of the collimator projection 31 beyond the surface of the tube 25 coincides with the pellet stack in at least one of the adjacent tubes. In most circumstances, however, the space between adjacent fuel rods is filled with water, or some other appropriate material, that serves to shield or absorb those radiations emitted from the adjacent fuel rods that are in general alignment with the offset collimator projection 31. This absorption, of course, tends to mitigate the influence of direct pellet radition on the radiation background that is incident on the detector 22 (FIG. 1), and thereby enable the $Xe^{133}$ radiation to be more readily distinguishable.

In operation, the radiation shield 16 (FIG. 1) is positioned above the upper end fitting 13 in alignment with the longitudinal axis of one of the fuel rods 11. This alignment can match either of the two illustrative collimator alignment configurations that are shown in FIG. 2 of the drawing, or it may conform to some other alignment that is more appropriate to a specific fuel rod design, reactor core environment or further consideration, as circumstances dictate.

The $\gamma$-rays which characterize the radioisotope that has been selected for observation (e.g. $Xe^{133}$) pass through the collimator and are registered by the detector 22 in order to accumulate in a "counter," or the like, for a period of time that is primarily determined by statistical considerations. After acquiring an acceptable cumulative count, a determination can be made with respect to the structural integrity of the fuel rod. Typically, an appreciably lower than "normal" count (or count rate, if counts per unit time is selected as a basis for radioisotope observation) is indicative of a failed fuel rod. A "normal" or greater than "normal" detector response, however, demonstrates that the fuel rod undergoing inspection is in a structurally sound condition because none of the fission product inventory appears to have leaked out of the rod.

The principles of this invention can be embodied in a number of structural arrangements that differ from those described above. In this respect, a probe-mounted detector of appropriate dimensions could be inserted between the fuel rods in order to monitor the fission product inventory within the fuel rods.

The embodiments of the invention in which an exclusive property or privilege is claimed are defined as follows:

1. Apparatus for inspecting the structural integrity of radioactive fuel rods comprising a radiation shield having a radiation collimator formed therein in alignment with one of the fuel rods for the transmission of fuel rod radiation therethrough, a radiation energy sensitive detector within said shield and in alignment with said collimator and said transmitted fuel rod radiation for producing a signal that characterizes at least one radioactive material within the fuel rod, means for determining if the radioactive material has been retained within the rod, and means for aligning said collimator and said detector with the fuel rod.

2. Apparatus according to claim 1 wherein said radiation energy sensitive detector further comprises a lithium-drifted germanium semiconductor detector.

3. A method for inspecting the structural integrity of radioactive fuel rods comprising the steps of aligning a radiation energy sensitive detector with one of the fuel rods, and counting the radiations emitted from the rod that characterize at least one of the radioactive materials within the rod in order to determine if the radioactive material has been retained within the rod.

* * * * *